R. P. ROSS.
GATE.
APPLICATION FILED MAY 5, 1916.
1,248,165.
Patented Nov. 27, 1917.
2 SHEETS—SHEET 1.
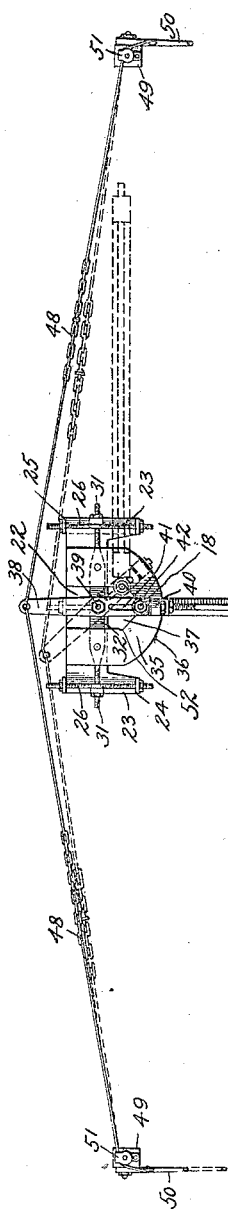
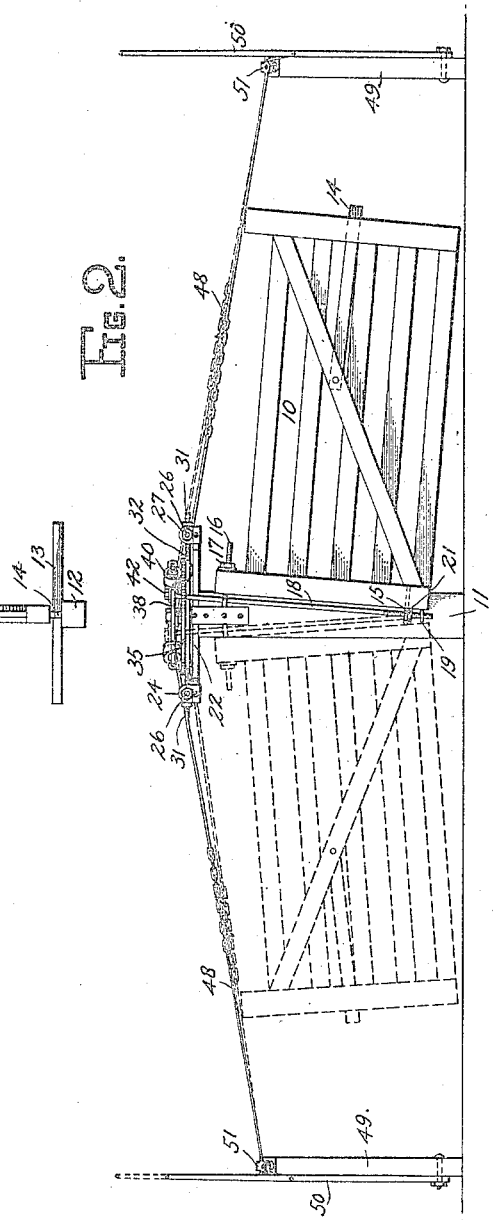
WITNESSES
INVENTOR
Richard P. Ross.
BY
ATTORNEY

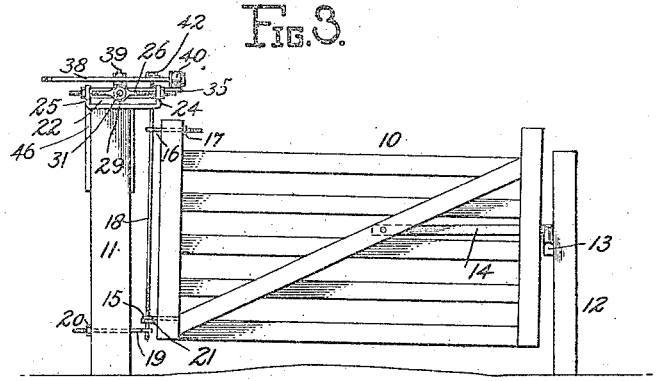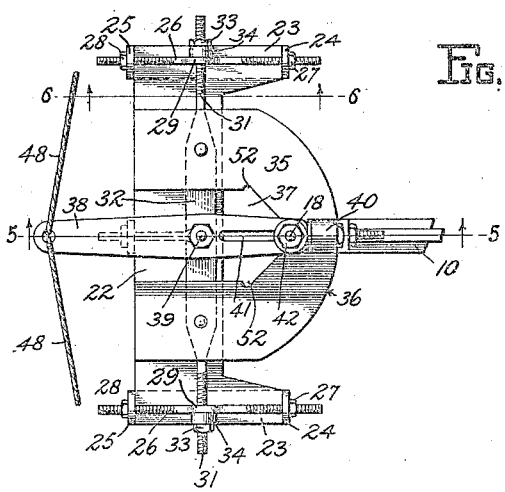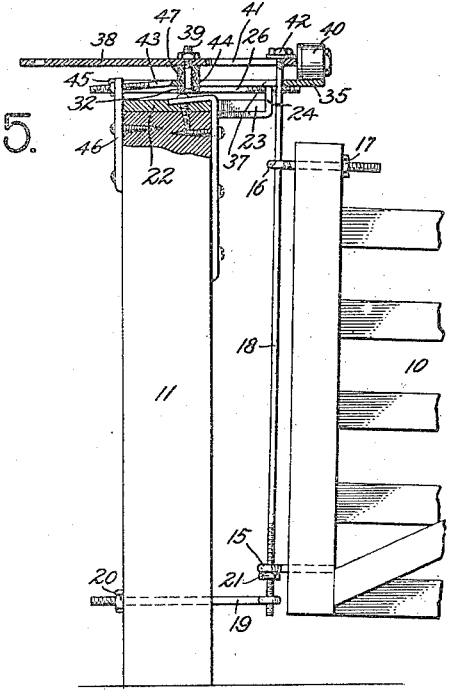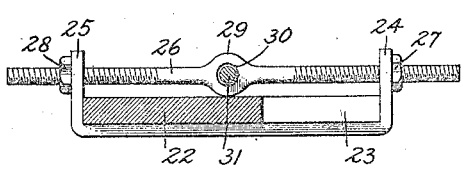

UNITED STATES PATENT OFFICE.

RICHARD P. ROSS, OF WATERFORD, OHIO.

GATE.

1,248,165.                    Specification of Letters Patent.        Patented Nov. 27, 1917.

Application filed May 5, 1916. Serial No. 95,663.

*To all whom it may concern:*

Be it known that I, RICHARD P. ROSS, a citizen of the United States, residing at Waterford, in the county of Washington and State of Ohio, have invented certain new and useful Improvements in Gates, of which the following is a specification.

This invention relates to gates designed primarily to guard and close uninterrupted passage along roads but which is provided with operating mechanism for opening and closing the same and means for actuating said mechanism so positioned as to be within convenient reach of persons in vehicles or on horseback who desire to pass through the gate in either direction.

One object of the invention is to provide a strong and simple gate supporting an operating mechanism, the several parts of which may be readily renewed when broken or worn either by substituting stock parts or parts which may be easily made by any carpenter or blacksmith.

Another object of the invention is to provide an operating mechanism with means for adjusting the gate so that it may be made to swing at all times free of the ground and maintain the proper relation between the latch on the gate and its keeper to insure engagement therebetween when the gate is closed.

Still another object of the invention is to support the gate on an upright pivot rod adapted to be moved in such manner in any direction from the vertical as to cause the gate to swing by gravity both to open and closed positions.

Other objects of the invention as well as the details of construction will be better understood from the following description illustrated by the accompanying drawings in which:

Figure 1 is a top plan view of a gate provided with improved operating mechanism, Fig. 2 is an elevation of the same viewed from the side of the road, the gate being shown open, Fig. 3 is an elevation of the gate and its operating mechanism as it appears when approaching the same, the gate being closed;

Fig. 4 is an enlarged plan view of the operating mechanism mounted upon the hinge post of the gate, Fig. 5 is an elevation partly in section of the mechanism shown in Fig. 4 including a portion of the gate, and, Fig. 6 is an enlarged view of the details of construction.

Referring to the drawings by numerals, 10 indicates a gate of any suitable construction adapted to close a road or wherever gates may be used, said gate being hinged to a post 11 and closing adjacent a post 12 on which post is a keeper 13 fastened to the inner side thereof and projecting beyond said post on either side with which keeper a latch 14 on the gate 10 is adapted to engage and lock the gate in closed position. The latch and its keeper are of well known construction and need no further description.

Projecting from the rear of the gate near the bottom is a hinge member 15 in the nature of an eye bolt screwed permanently into the gate while a similar bolt 16 projects rearwardly from the top of the gate but is adjustable by means of a nut 17 on said bolt which upon turning moves the eye of the bolt 16 away from or toward the rear of the gate. Passing vertically through the eyes of bolts 15 and 16 is a hinge rod 18, said rod passing through and turning freely in an eye bolt 19 projecting horizontally from the post 11 toward the gate below the hinge member 15 and adjustable in said bolt by a nut 20 threaded on the end opposite the eye. The lower end of the hinge rod 18 is threaded and fitted with a nut 21 which serves as a bearing for the lower hinge member 15, said nut serving to raise or lower the gate and thereby adjust its height to prevent said gate from dragging over the ground when swinging into open and closed positions.

The post 11 preferably projects a short distance above the top of the gate and on the top thereof is secured a horizontal plate 22 that projects beyond the sides of the bolt in a direction substantially parallel with the gate when in open position and crosswise of the gate when closed. At each end of the plate 22 on the edge facing the roadway is a horizontal continuation 23 of said plate that terminates with a vertical ear 24. An ear 25 projects upwardly from the opposite edge of the plate 22 at each end forming with the ear 24 at the same end bearings for a cross rod 26, each end of which is threaded to pass through openings in said ears and adjustably secured thereto by nuts 27 and 28. The center of each rod 26 is enlarged at 29 and has an opening 30 therethrough for the free passage therethrough of the rounded and threaded ends 31 of a longitudinally disposed plate 32, said plate being adjustable endwise between the rods 26 by nuts 33 and washers 34 on the threaded ends 31 of said plate and exterior to said rods.

By the construction so far described the longitudinal plate 32 is capable of adjustment with relation to the plate 22 and the post 11 in any direction. By properly turning the nut 33 on the ends 31 of said plate 32, the same may be moved endwise in either direction. Similar turning of the nuts 27, 28 on the rods 26 will if performed simultaneously move the plate 32 transversely across the plate 22, but if the nuts on one rod 26 only are turned the plate 32 will then be given angular adjustment with relation to the plate 22 as will be apparent from an examination of Fig. 4.

Bolted or riveted on the top of the longitudinal plate 32 is a cam plate 35 that projects horizontally toward the gate 10 beyond the post 11, the projecting edge 36 of said post being curved on an arc described from a radius having its axis in the center of the plate 32. The center of the cam plate 35 is cut away at 37 through which cut-away portion the upper end of the hinge rod passes, said hinge rod when the gate is closed inclining from the vertical in a direction away from the post 11 at its upper end thereby throwing the gate downwardly at its outer end at an angle sufficient to cause said gate to swing by gravity into closed position with the post 12. The inclination of the hinge rod 18 is limited by the cut-away portion 37 of the plate 35 against which it bears as it passes therethrough. The cam surface of the cut-away portion 37 is preferably made with two inclined faces meeting at a common point that forms the resting place for the hinge rod when the gate is closed. The outer end of each cam surface terminates in a shoulder 52 to support the hinge rod when the gate is in open position on one side or the other. Above the plate 35 is a horizontal lever 38 pivotally mounted intermediate its ends on a bolt 39 that projects upwardly from the center of the longitudinal plate 32 in the axis of the outer curved edge 36 of the plate 35. A roller 40 is mounted to turn on a horizontal journal projecting from the inner end of the lever 38 and rolls over the upper surface of plate 35 as the gate swings. A longitudinal slot 41 is cut in the lever 38 behind the roller 40 through which the upper end of the hinge rod 18 projects and which is held in position by a nut 42 screwed on the upper end of the rod against a washer that bears upon and slides over said lever. As a further means, other than the rods 26, to sustain the plate 32 under the strain of the hanging gate, a brace or tension bolt 43 is provided just below the lever, said bolt having an eye 44 at one end through which the pivot bolt 39 passes and a thread on its other end for a nut 45 that bears upon a lug 46 fastened to the post 11 and projecting above its upper end, the threaded end of the tension bolt passing through said lug. Spacers 47 are slipped over the pivot bolt 39 to maintain the lever 38 at a proper distance above the cam plate 35 that the roller 40 may run freely.

Fastened on the outer end of the lever 38 are two draw members 48 which may be of rope, chain, wire, rods, or a combination of these as shown. These members extend to posts 49 on the same side of the road as the hinge post 11 but on opposite sides of the gate and at a desirable distance therefrom. An operating lever 50 is pivoted at one end on each post 49 and a pulley 51 is also mounted on the top of each post. The draw members 48 are passed around these pulleys and their ends attached each to a lever 50 and hold said levers when the gate is closed in a substantially upright position, as shown in Fig. 1.

When a person on horse-back or in a vehicle approaches the gate and desires to open the same, he grabs the hand lever 50 and pulls the same downwardly, tensioning the draw member 48 connected thereto and swinging the horizontal lever 38 to one side as shown in dotted lines in Fig. 1. The hinge rod 18 at its upper end bearing against the cut-away or cam portion 37 of the plate 35 will be carried to one side and brought to rest against a shoulder 52 at the end of the cam surface. In this position the hinge rod 18 will incline away from the person approaching, and as this same movement of the lever 38 also lifts the outer end of the gate 1, the latch 14 becomes disengaged from its keeper 13 and gravity causes the gate to swing into open position as in Figs. 1 and 2. After passing through the gate, the rider pulls upon the other lever 50 to return the horizontal lever 38 to its medium position, which movement causes the hinge rod 18 to incline toward the post 12 and also elevates the outer end sufficiently to change the center of gravity and cause the gate to swing into closed position.

If through use or wear the outer end of the gate drags upon the ground, it may be lifted out of contact therewith by turning the nut 17 on the upper hinge member 16 or by moving the cross rods 26 rearwardly by means of their nuts 28, which movement carries the plates 32 and 35 in a rearward direction and tends to lessen the inclination of the hinge rod 18 which is in contact at all times with the inner or cam surface 37 of the plate 35. Lateral inclination of the gate is corrected by turning the nuts 33 to move the plates 32 and 35 crosswise of the normal closed position of the gate and it is evident that other adjustment may be made by turning such of the nuts 27, 28 and 33 as will bring the gate into the proper operative position.

While I have shown and described what I consider the best construction of the gate shown at the present time, it is evident that various changes in construction and arrangement of parts may be made within the limits of the claims without departing from the spirit of the invention.

What is claimed is:

1. In combination with a gate and a gate post, hinge members for the gate mounted on said parts, a hinge rod passing freely through all of said members, a lever mounted at the top of said gate post to swing in a horizontal plane, through one arm of which lever the hinge rod passes freely, a cam plate parallel to said lever for guiding the hinge rod, means for simultaneously adjusting the cam plate and the lever parallel to and transversely of the line of travel through the gate, and means connected to the lever for swinging the same to change the angle of the hinge rod and cause the gate to open by gravity.

2. In combination with a gate and a gate post, hinge members for the gate mounted on said parts, a hinge rod passing freely through all of said members, a cam plate on the top of the gate post, a lever pivoted on said cam plate to swing in a horizontal plane, one arm of said lever having a longitudinal slot for the free passage therethrough of the hinge rod, means for bodily adjusting the cam plate and lever transversely of the line of travel through the gate, means supported by the latter means for adjusting said parts parallel to the line of travel, and means at a distance from said gate on each side thereof connected to the lever for swinging the same to change the angle of the hinge rod and cause the gate to open by gravity.

3. In combination with a gate, and a gate post, hinge members for the gate mounted on said parts, a hinge rod passing through said members and having means thereon for sustaining the gate, a cam plate on the upper end of said gate post, a swinging lever above the cam plate, means for adjusting said cam plate and lever parallel to and transversely of the line of travel through the gate, means on the upper end of the hinge rod on which it is suspended from said lever, and means for operating said lever to move said hinge rod over with said cam plate to change its angle and the center of gravity of said gate.

4. In combination with a gate, and a gate post, hinge members for the gate mounted on said parts, a horizontal cam plate adjustably supported above the gate post, a horizontal swinging lever adjustable with said cam plate and above the same, a hinge rod passing through said hinge members and said lever in contact with the cam plate, means on the upper end of said rod for suspending the same from said lever, and means at a distance for operating said lever to change the angle of said hinge rod and the center of gravity of the gate to cause the latter to swing into open and closed positions.

5. In combination with a gate, and a gate post, hinge members for the gate mounted on said post, a horizontal cam plate supported above said post, means for adjusting the horizontal position of said plate, a horizontally swinging lever above said cam plate and movable therewith in its adjustment, a roller on one end of said lever adapted to travel over the upper face of said cam plate, a hinge rod passing through said hinge members and through said horizontal lever in contact with said cam plate, means on the upper end of said rod to suspend the same from said lever, and means at a distance for operating said lever to change the angle of the rod whereby the center of gravity of the gate is changed and the latter caused to swing into open and closed positions.

6. In combination with a gate, and a gate post, hinge members for the gate mounted on said parts, a horizontal plate secured to the top of said post and extending across the same, longitudinally adjustable bars mounted on the ends of said plates, a cross plate extending between and supported by said bars and longitudinally adjustable thereon, a cam plate rigidly secured to said latter plate and adjustable therewith, a horizontal lever pivoted on said adjustable plate and projecting over said cam plate, a roller on said lever adapted to travel over the upper face of the cam plate, a hinge rod passing through said hinge members and through said lever and having adjustable means thereon for sustaining the gate, means on the upper end of said hinge rod and bearing on said lever for suspending said rod, and means at a distance for operating said lever to change the angle of the hinge rod whereby the center of gravity of the gate is changed and the latter caused to swing into open and closed positions.

In testimony whereof I affix my signature in presence of two witnesses.

RICHARD P. ROSS.

Witnesses:
EARL WHITE,
C. R. BELL.

Copies of this patent may be obtained for five cents each, by addressing the "Commissioner of Patents, Washington, D. C."